(12) United States Patent
Yamaguchi

(10) Patent No.: US 8,572,082 B2
(45) Date of Patent: Oct. 29, 2013

(54) METHOD AND DEVICE FOR GENERATING A SIMILAR MEANING TERM LIST AND SEARCH METHOD AND DEVICE USING THE SIMILAR MEANING TERM LIST

(75) Inventor: Tomoharu Yamaguchi, Kodaira (JP)

(73) Assignee: Casio Computer Co., Ltd, Tokyo (JP)

( * ) Notice: Subject to any disclaimer, the term of this patent is extended or adjusted under 35 U.S.C. 154(b) by 0 days.

(21) Appl. No.: 13/424,602

(22) Filed: Mar. 20, 2012

(65) Prior Publication Data

US 2012/0246162 A1    Sep. 27, 2012

(30) Foreign Application Priority Data

Mar. 24, 2011    (JP) ................................. 2011-066511

(51) Int. Cl.
*G06F 7/00*    (2006.01)
*G06F 17/30*    (2006.01)

(52) U.S. Cl.
CPC .. *G06F 7/00* (2013.01); *G06F 17/30* (2013.01)
USPC ............................ 707/736; 707/737; 707/755

(58) Field of Classification Search
None
See application file for complete search history.

(56) References Cited

FOREIGN PATENT DOCUMENTS

| JP | 10-334105 | 12/1998 |
|---|---|---|
| JP | 10-334106 | 12/1998 |
| JP | 2003-271631 | 9/2003 |
| JP | 2004-118262 | 4/2004 |
| JP | 2004-280661 | 10/2004 |
| JP | 2006-215717 | 8/2006 |
| JP | 2009-093581 | 4/2009 |
| JP | 2010-003015 | 1/2010 |
| WO | 2010106642 | 9/2010 |

OTHER PUBLICATIONS

English Translation, Nobuyuki et al., Japanese Patent Publication 2004-280661, Fujitsu Ltd, Publication Date: Oct. 7, 2004.*
English Translation, Yoichi et al., Japanese Patent Publication 2003-271631, NTT Data Technology Corp, Publication Date: Sep. 26, 2003.*
Japanese Office Action for Japanese Application No. 2011-066511 mailed on Jan. 15, 2013.
Japanese Office Action for Japanese Application No. 2011-066511 mailed on Apr. 16, 2013.

* cited by examiner

*Primary Examiner* — Jay Morrison
(74) *Attorney, Agent, or Firm* — Turocy & Watson, LLP

(57) ABSTRACT

In a generation device, a term determiner, for reference terms and a similar meaning term that has similar meaning to any of the reference terms, determines if each of the reference terms and the similar meaning term are both included in a document data group. An extractor extracts a reference term and the similar meaning term of the reference term that were both determined to be included in the document data group. A priority determiner determines an output priority to the extracted similar meaning term on the basis of appearance of at least either of the similar meaning term and the reference term in the document data group. And a list generator generates a the similar meaning term list in such a way that the extracted reference term, the similar meaning term of the extracted reference term, and the output priority are associated with one another.

8 Claims, 12 Drawing Sheets

FIG. 3

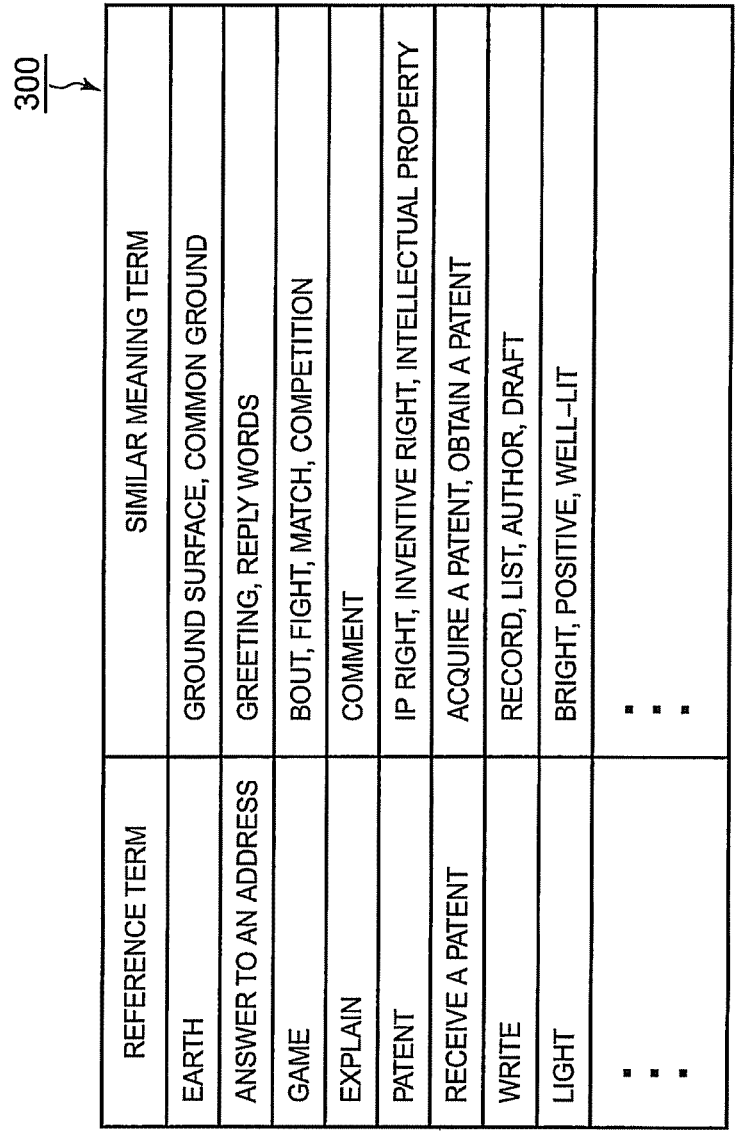

| REFERENCE TERM | SIMILAR MEANING TERM |
|---|---|
| EARTH | GROUND SURFACE, COMMON GROUND |
| ANSWER TO AN ADDRESS | GREETING, REPLY WORDS |
| GAME | BOUT, FIGHT, MATCH, COMPETITION |
| EXPLAIN | COMMENT |
| PATENT | IP RIGHT, INVENTIVE RIGHT, INTELLECTUAL PROPERTY |
| RECEIVE A PATENT | ACQUIRE A PATENT, OBTAIN A PATENT |
| WRITE | RECORD, LIST, AUTHOR, DRAFT |
| LIGHT | BRIGHT, POSITIVE, WELL-LIT |
| ... | ... |

SIMILAR MEANING TERM DATABASE

| REFERENCE TERM | SIMILAR MEANING TERM |
|---|---|
| EARTH | GROUND SURFACE, ~~COMMON GROUND~~ |
| ~~ANSWER TO AN ADDRESS~~ | ~~GREETING, REPLY WORDS~~ |
| GAME | ~~BOUT,~~ FIGHT, MATCH, COMPETITION |
| EXPLAIN | COMMENT |
| PATENT | IP RIGHT, ~~INVENTIVE RIGHT,~~ INTELLECTUAL PROPERTY |
| ~~RECEIVE A PATENT~~ | ~~ACQUIRE A PATENT, OBTAIN A PATENT~~ |
| WRITE | RECORD, LIST, ~~AUTHOR,~~ DRAFT |
| LIGHT | BRIGHT, POSITIVE, ~~WELL-LIT~~ |
| ⋮ | ⋮ |

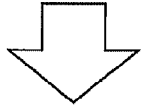

| REFERENCE TERM | SIMILAR MEANING TERM |
|---|---|
| EARTH | GROUND SURFACE |
| GAME | FIGHT, MATCH, COMPETITION |
| EXPLAIN | COMMENT |
| PATENT | IP RIGHT, INTELLECTUAL PROPERTY |
| WRITE | RECORD, LIST, DRAFT |
| LIGHT | BRIGHT, POSITIVE |
| ⋮ | ⋮ |

EXAMPLES OF REFERENCE TERMS AND SIMILAR MEANING TERMS EXTRACTED FROM SIMILAR MEANING TERM DATABASE

DEGRADE RANK OF SIMILAR MEANING TERM "GROUND" BY 1

| REFERENCE TERM | SIMILAR MEANING TERM |
|---|---|
| EARTH | GROUND SURFACE(-3) |
| GAME | FIGHT(-1), MATCH(0), COMPETITION(-4) |
| EXPLAIN | COMMENT(0) |
| PATENT | IP RIGHT(-2), INTELLECTUAL PROPERTY(0) |
| WRITE | RECORD(-6), LIST(-3), DRAFT(-1) |
| LIGHT | BRIGHT(0), POSITIVE(-3) |
| ⋮ | ⋮ |

EXAMPLE OF SIMILAR MEANING TERM LIST GENERATED BY SETTING RANKS TO SIMILAR MEANING TERMS

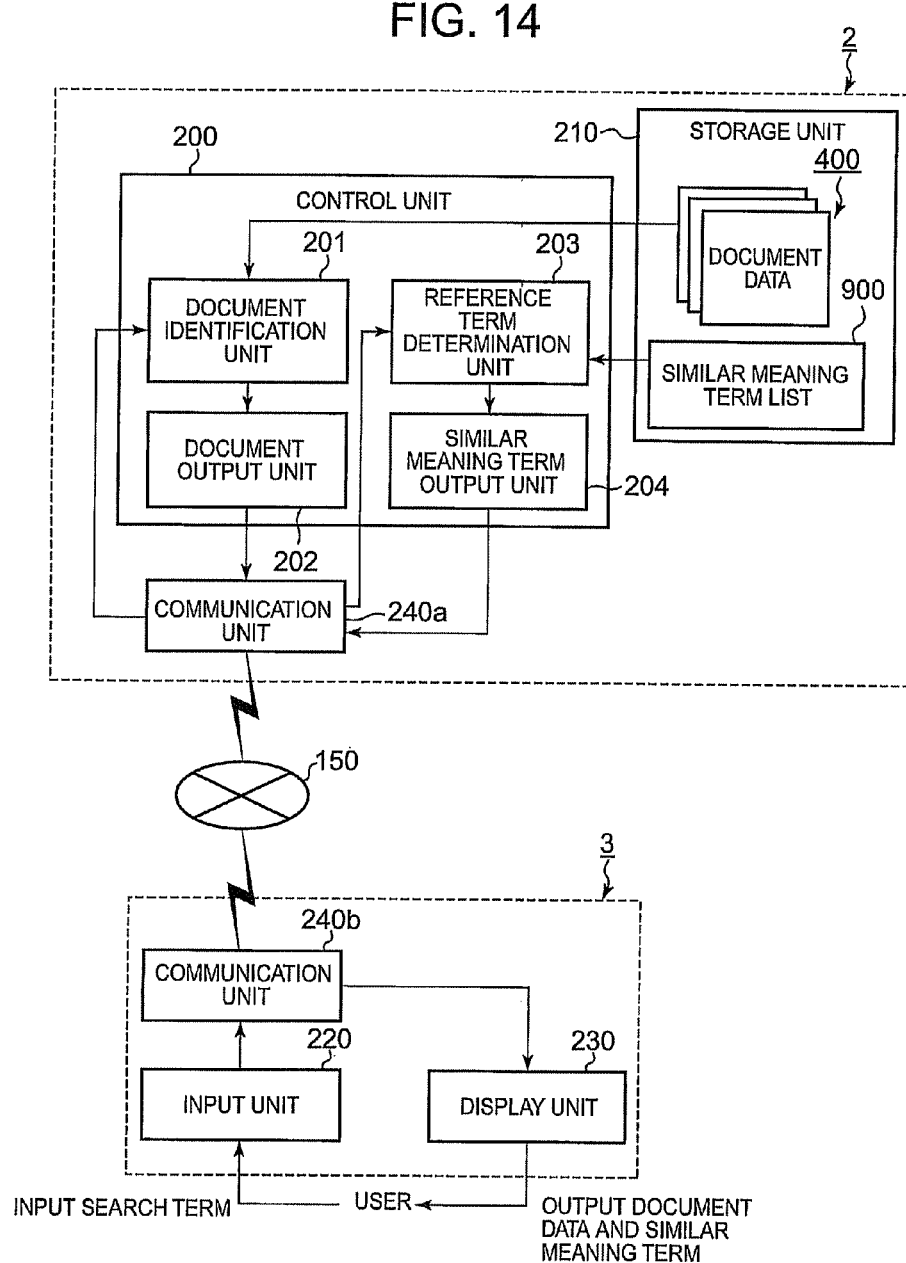

METHOD AND DEVICE FOR GENERATING A SIMILAR MEANING TERM LIST AND SEARCH METHOD AND DEVICE USING THE SIMILAR MEANING TERM LIST

CROSS-REFERENCE TO RELATED APPLICATION

This application claims the benefit of Japanese Patent Application No. 2011-066511, filed on Mar. 24, 2011, the entire disclosure of which is incorporated by reference herein.

FIELD

This application relates to a method and device for generating a similar meaning term list that is suitable for effectively searching a search term by extending the search term to a similar meaning term, as well as a search method and device using the similar meaning term list.

BACKGROUND

With the increased computerization of documents, search technology has become more important for finding a desired document from a large amount of documents that have been accumulated so far. A typical search using an electronic device finds a document by including a search term inputted by the user from a document group to be searched, and displays the found document to the user.

In natural language, what a term means can be expressed by another term. For example, the term, "the largest island in the world" has the same meaning of the term, "an island that is the largest in the world". In searching by simply finding the same string, if the user inputs "the largest island in the world" as a search term, the user cannot find any document that includes "an island that is the largest in the world". Therefore, herein lies a problem in that it is difficult to find documents that are desired by the user. In order to solve this problem, various arts to extend a search term to an appropriate similar meaning term and search by the extended search keyword have been recently developed for improving the usability of search engine.

For example, Patent Literature 1 (Unexamined Japanese Patent Application KOKAI Publication No. 2004-118262) discloses an art to extend a search term to a synonym and also to reduce the number of documents to be searched in order to reduce the search noise. Patent Literature 2 (Unexamined Japanese Patent Application KOKAI Publication No. 2006-215717) discloses an art to evaluate the similarity between a synonym to a search term and to conduct the search based on the similarity, thereby preferentially searching by the similar meaning term that has more similar meaning to the search term.

Extending a search term to a synonym can decrease search omission, but does not necessarily lead to an effective search. For example, an unnecessary search may be performed, such as searching a document that the user does not intend to search or searching the same document by a plurality of synonyms. Therefore, there is a need for an art to extend the search term to a precise synonym and also to perform an effective search.

SUMMARY

The present invention is for solving the above problems and has an objective to provide a method and device for generating a similar meaning term list that is suitable for extending a search term to a similar meaning term and performing an effective search, as well as a search method and device using the similar meaning term list.

To achieve the above objective, a method for generating a similar meaning term list according to the present invention includes:

determining if, for a plurality of reference terms and a similar meaning term that has similar meaning to any of the reference terms, each of the reference terms and the similar meaning term of the reference terms both are included in a document data group;

extracting, from the plurality of reference terms and the similar meaning term of the reference terms, a reference term and similar meaning term of the reference term that were both determined to be included in the document data group;

determining an output priority to the extracted similar meaning term on the basis of appearance of at least either one of the extracted similar meaning term and the reference term corresponded to the similar meaning term in the document data group; and generating a similar meaning term list in which the extracted reference term, the similar meaning term of the extracted reference term, and the output priority provided to the similar meaning term are associated with one another.

BRIEF DESCRIPTION OF THE DRAWINGS

A more complete understanding of this application can be obtained when the following detailed description is considered in conjunction with the following drawings, in which:

FIG. 3 is a configuration of a similar meaning term database according to the embodiment of the present invention;

FIG. 6 is an illustration showing how reference terms and similar meaning terms are extracted from a similar meaning term database according to the embodiment of the present invention;

FIG. 14 is a schematic configuration of a search device according to another embodiment of the present invention.

DETAILED DESCRIPTION

Hereinafter, embodiments of the present invention will be described with reference to the drawings. The following embodiments are for explaining the present invention, not limiting the scope of the present invention. Accordingly, a person skilled in the art can employ embodiments in which each of the undermentioned components is substituted by an equivalent component, and these embodiments are included in the scope of the present invention. In the following description, a well-known art that is not important will not be described in order to facilitate understanding of the present invention.

Figure 1:
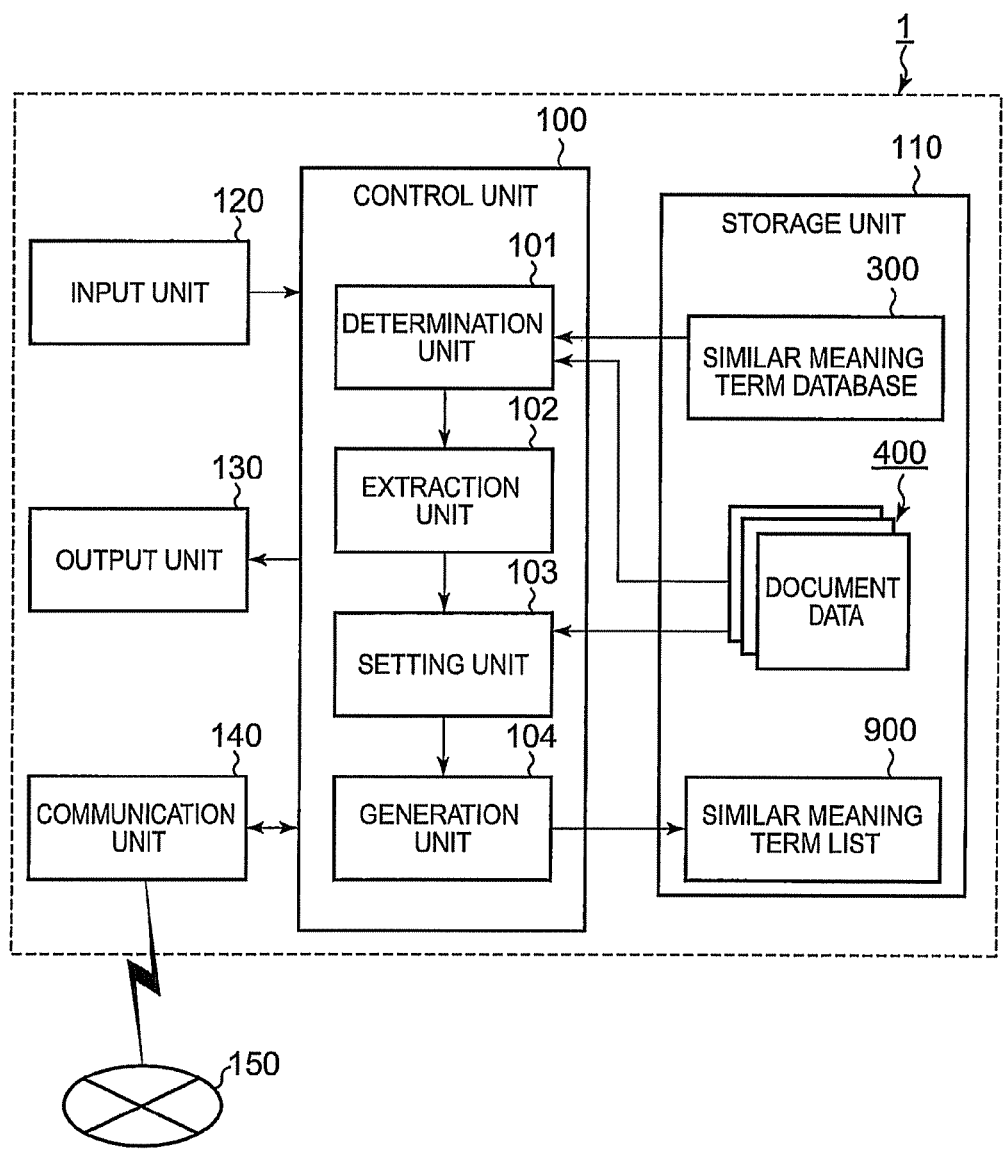
FIG. 1 is a schematic configuration of a device for generating a similar meaning term list according to an embodiment of the present invention.
Figure 2:
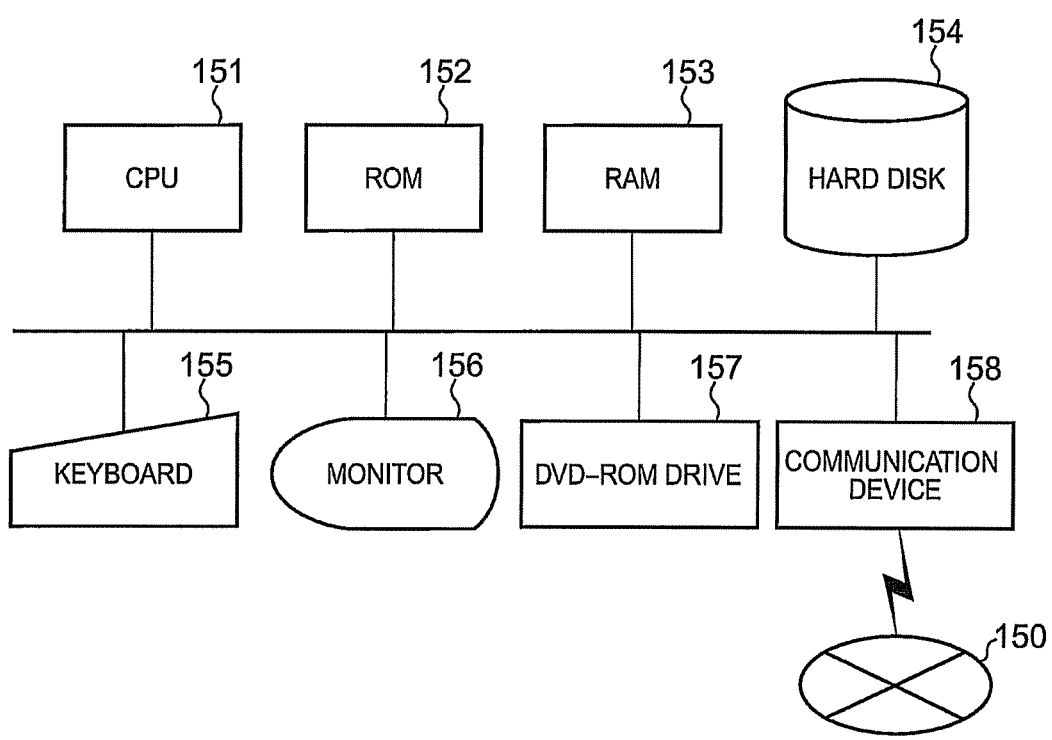
FIG. 2 is a physical configuration of a device for generating a similar meaning term list according to the embodiment of the present invention.

First, FIG. 1 is a configuration of an information processor in which a generation device 1 for generating a similar meaning term list according to the present embodiment is realized. That is, the generation device 1 includes a control unit 100, a storage unit 110, an input unit 120, an output unit 130 and a communication unit 140. The generation device 1 is physically composed as illustrated in FIG. 2, and includes a central processing unit (CPU) 151, a read-only memory (ROM) 152, a random access memory (RAM) 153, a hard disk 154, a keyboard 155, a monitor 156, a DVD-ROM drive 157 and a communication device 158. Hereinafter, the components of the generation device 1 will be described with reference to FIGS. 1 and 2.

The control unit 100, which controls the entire operation of the generation device 1, is connected to each component and exchanges a control signal and data with each component. That is, the control unit 100 is connected to the storage unit 110, input unit 120, output unit 130 and communication unit 140 and uses functions of these units to perform the processing for generating a similar meaning term list that will be described later.

The control unit 100 includes a determination unit 101, an extraction unit 102, a setting unit 103 and a generation unit 104. In detail, as will be described later, the generation device 1 for generating a similar meaning term list uses functions of these units to perform the processing for generating a similar meaning term list 900 on the basis of a similar meaning term database 300, the similar meaning term list 900 being used for searching a plurality of document data (a document data group 400).

The document data group used is preferable to be identical to a document to be searched using the similar meaning term list 900 described below. Alternatively, the document data group is preferable to be a part of the document to be searched, shares a common part with the document to be searched, or at least has a common tendency with the document to be searched.

Such a control unit 100 (determination unit 101, extraction unit 102, setting unit 103 and generation unit 104) including for example, a CPU 151. The CPU 151 is interconnected to each component via a system bus that is a transmission path for transferring command and data and the CPU operates according to a computer program and various data that are stored in a ROM 152 and are necessary for controlling the entire operation of the generation device 1. While the CPU 151 temporarily stores the computer program and data necessary for performing the processing, read out from the ROM 152 or the like in, the RAM 153, the CPU 151 controls various operations. Because the CPU 151' operates with the ROM 152 and RAM 153, the control unit 100 controls the entire operation of the generation device 1.

The storage unit 110 includes, for example, an external mass storage device such as the hard disk 154 and stores various data necessary for the control unit 100 to perform the processing for generating the similar meaning term list 900. Specifically, the storage unit 110 stores the similar meaning term database 300 which the generated similar meaning term list 900 is based on, stores a plurality of document data (a document data group 400). The storage unit 110 also stores the similar meaning term list 900 generated by the processing of the generation device 1.

The similar meaning term database 300 that is previously stored in the storage unit 110 has data structure as shown in FIG. 3. That is, the similar meaning term database 300 includes a plurality of combinations of a reference term and similar meaning term(s) corresponding to the reference term. To one reference term, one or more similar meaning terms that have similar meaning to that of the reference term may correspond to it. For example, for a reference term "earth", two similar meaning terms, "ground surface" and "common ground" correspond to that of "earth." For a reference term "game", four corresponding similar meaning terms may be "bout", "fight", "match" and "competition".

The reference term and similar meaning term may not be necessarily composed of one word, but may be composed of a plurality of words, such as a reference term "receive a patent" and a similar meaning term "response words" in FIG. 3. In other words, the similar meaning term includes both words, one is the same as the reference term as a whole and other is a word (synonym) having a similar meaning.

Such a similar meaning term database 300 may be generated in various ways. For example, the similar meaning term database 300 may be generated by utilizing an existing similar meaning term database such as various well-known thesauri. For example, if a thesaurus having a large number of words is used, the generation device 1 can generate the similar meaning term list 900 having a large number of words, thereby improving the usability of the search, but, at the same time, increasing the data size of the generated similar meaning term list 900.

Figure 4:
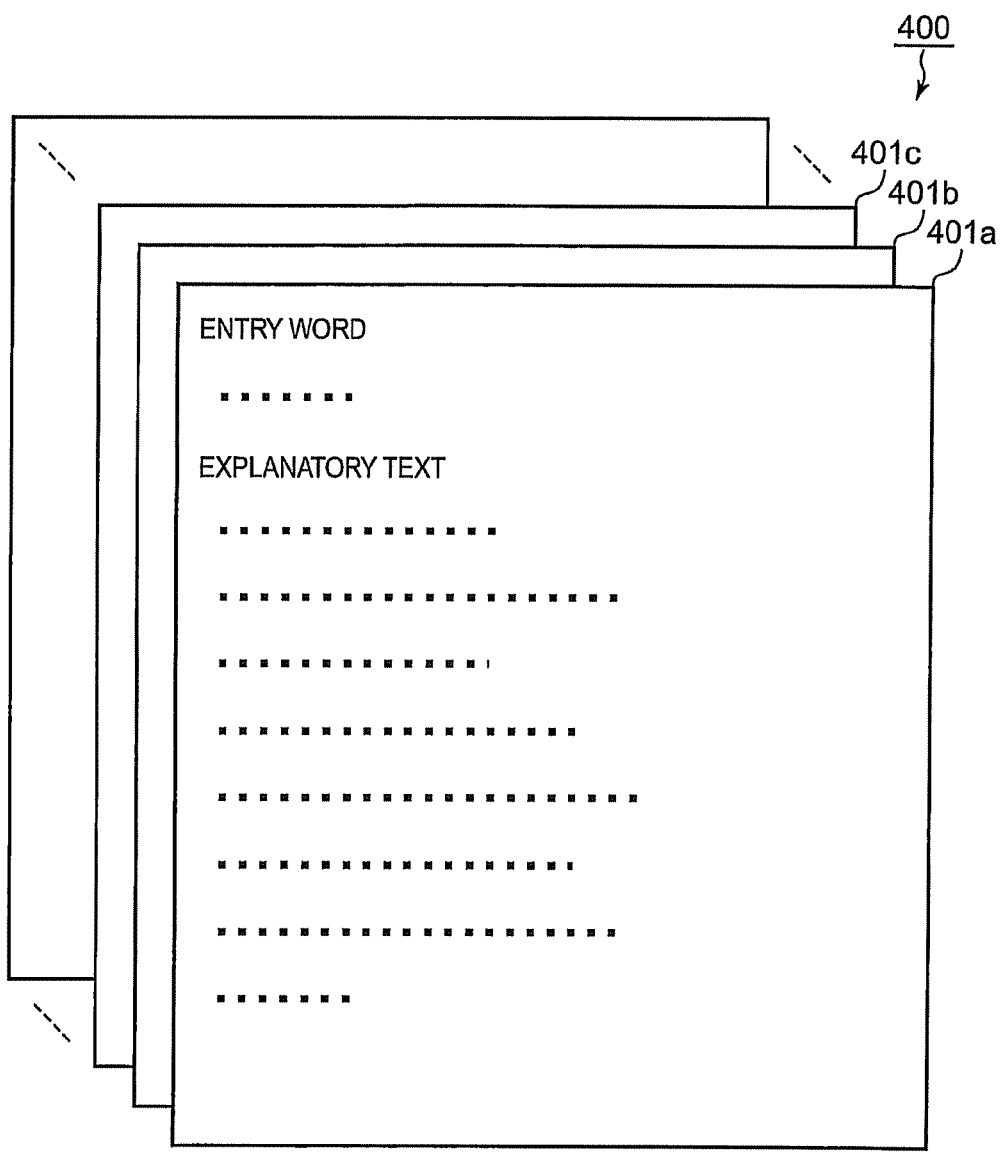
FIG. 4 is a configuration of document data according to the embodiment of the present invention.

The document data group 400 previously stored in the storage unit 110 has a structure as shown in FIG. 4. That is, the document data group 400 is composed of individual document data 401 (document data 401a to 401c), and each of the document data 401a to 401c is composed of "an entry word" and "an explanatory text". That is, each of the document data 401a to 401c is a unit that composes a dictionary; and "an entry word" is one term as an entry to the dictionary and each entry word corresponds to one document data 401. To "an entry word", is a corresponding "an explanatory text" explaining the entry word. The entry word and explanatory text compose one document data 401. The same number of such document data 401 as that of "an entry word" exist and the entire document data 401 compose the document data group 400.

Returning to FIGS. 1 and 2, these data stored in the storage unit 110 is exchanged with external device via, for example, the DVD-ROM drive 157 of the generation device 1 or a network 150 connected by the communication unit 140.

The input unit 120 includes an input device such as the keyboard 155 and receives input an operation from the user. The received input information is supplied to the control unit 100. In the present embodiment, input an operation for generating the similar meaning term list 900 is received from the user.

The output unit 130 includes a display device such as the monitor 156 and outputs results of the processing by the control unit 100 to the user. In the present embodiment, processes and results of the processing for generating the similar meaning term list 900 that is performed by each of the determination unit 101, extraction unit 102, setting unit 103 and generation unit 104 are displayed on the monitor 156. This enables the user to obtain information about the processes and results of the processing.

The communication unit 140 connects the generation device 1 to the network 150 such as the Internet and exchanges data via the network 150 under control of the control unit 100. Such a communication unit 140 includes a proper communication device 158 such as a modem.

The generation device 1 composed as described above performs the processing for generating the similar meaning term list 900 under control of the control unit 100. Specifically, processing is performed according to procedures shown in a flow chart in FIG. 5.

This processing is started once the input unit 120 of the generation device 1 receives from the user an instruction to generate the similar meaning term list 900. That is, by the user's operation using the keyboard 155 to instruct the generation of the similar meaning term list 900, this processing is started.

Once the processing is started, the determination unit 101 of the generation device 1 specifies the first reference term in the similar meaning term database 300 (Step S501). That is, the determination unit 101 accesses the similar meaning term database 300 previously stored in the storage unit 110 thereby specifying the first reference term of a plurality of reference terms in the similar meaning term database 300. Specifically, in an example of the similar meaning term database 300 in FIG. 3, the first reference term "earth" is specified.

Next, the determination unit 101 determines if the specified reference term exists in the document data group 400 (Step S502). That is, the determination unit 101 determines if a string of the specified reference term is included in at least any one of the plurality of document data 401a to 401c that are stored in the storage unit 110. Each of the plurality of document data 401a to 401c is composed of an entry word and an explanatory text as shown in FIG. 4. If the reference term is included in either an entry word or an explanatory text, it is determined that the reference teen is included in the document data 401.

If it is determined that the specified reference term exists in the document data group 400 (Step S502; Yes), the extraction unit 102 extracts the specified reference term (Step S503). That is, the extraction unit 102 extracts the reference term existing in any of the document data 401 as a reference term for the similar meaning term list 900 to be generated.

The extraction unit 102 further extracts a similar meaning term of the specified reference term in the document data group 400 (Step S504). That is, for a reference term that was determined to exist in any of the document data 401, the determination unit 101 also determines if a similar meaning term corresponding to the reference term exists in any of the document data 401, and the similar meaning term that was determined to exist is extracted.

Specifically, explanation will be made in reference to the example of the similar meaning term database 300 in FIG. 3. First, if it is determined that the first reference term "earth" exists in the document data group 400, the reference term "earth" is extracted. Then, it is also determined if two terms "ground surface" and "common ground" that correspond to the extracted reference term (reference term "earth") as similar meaning terms thereof exist in the document data group 400. For example, if it is determined that the similar meaning term "ground surface" exists and the similar meaning term "common ground" does not exist, the similar meaning term "ground surface" is extracted and the similar meaning term "common ground" is not extracted.

Figure 5:
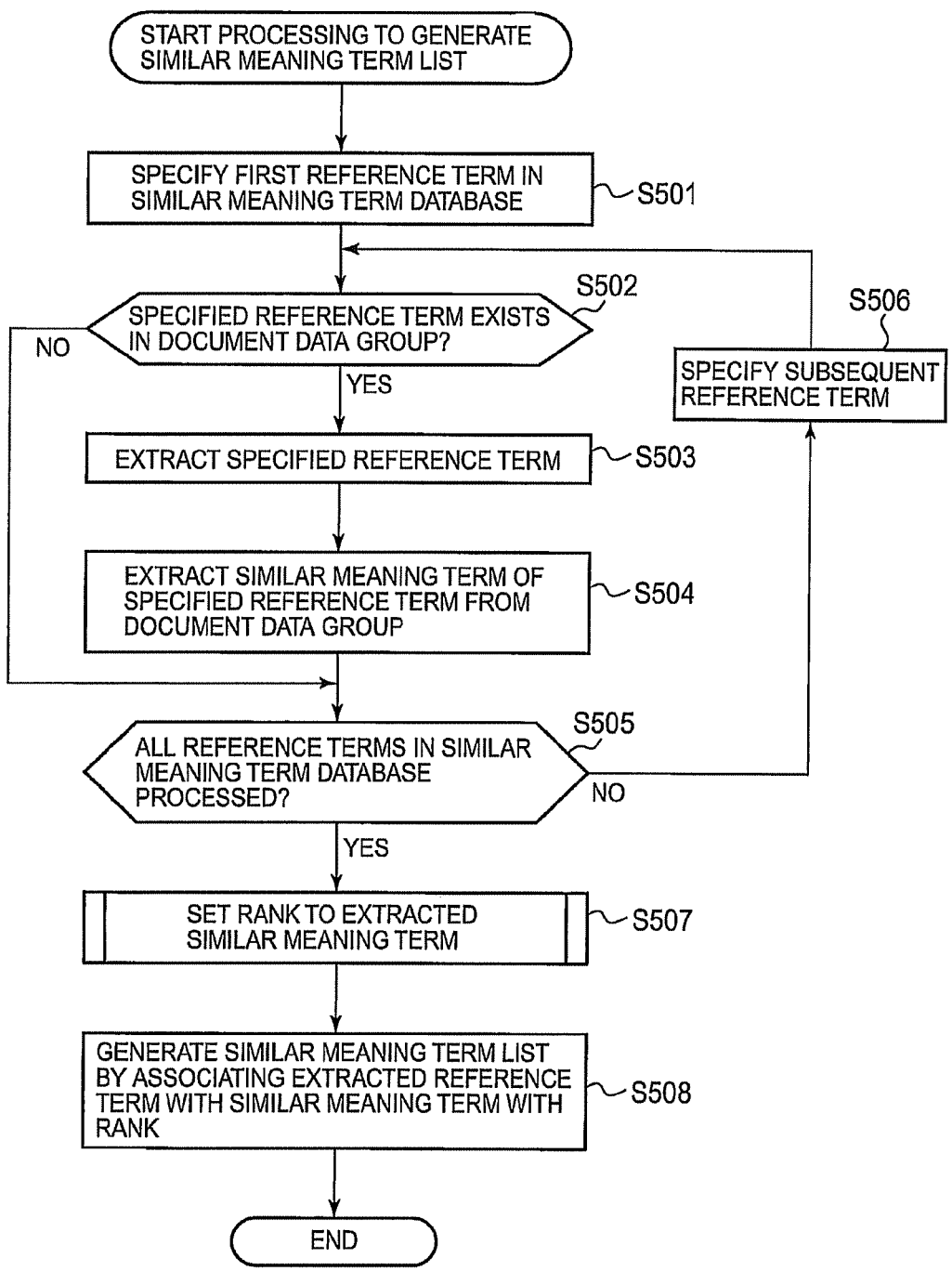
FIG. 5 is a flow chart illustrating the flow of processing by a generation device according to the embodiment of the present invention.

Returning to the flow chart in FIG. 5, if it is determined that the specified reference term does not exist in any of the document data 401 (Step S502; No), the reference term is not extracted and the corresponding similar meaning term is not extracted. That is because the reference term that does not exist in the document data group 400 is not necessary for searching in the document data group 400 and therefore the reference term is not necessary to be listed on the similar meaning term list 900.

After processing of the first reference term is completed, the determination unit 101 determines if all reference terms in the similar meaning term database 300 have been processed (Step S505). If there is an unprocessed reference term (Step S505; No), the determination unit 101 specifies the subsequent reference term (Step S506) and processing returns to Step S502. That is, for the second reference term and corresponding similar meaning term(s) thereof, processing is repeated to extract the reference term and similar meaning term(s) that exist in any of the document data 401.

Such processing is repeated for all the reference terms in the similar meaning term database 300, thereby extracting a reference term and similar meaning term(s) thereof that are included in any of the plurality of document data 401a to 401c. As a result, as shown in FIG. 6, any reference term and any similar meaning term thereof that do not exist in any of the document data 401 are removed from the similar meaning term database 300 previously stored (in FIG. 6, reference term and similar meaning term that are crossed), and other reference terms and similar meaning terms are extracted and remain in the database.

Specifically, in FIG. 6, with respect to the first reference term "earth", the similar meaning term "ground surface" is extracted and the similar meaning term "common ground" is removed. Since the second reference term "answer to an address" does not exist in any of the document data 401, "answer to an address", as well as two similar meaning terms corresponding thereto "greeting" and "response words" are removed without being extracted.

Returning to the flow chart in FIG. 5, when reference terms and similar meaning terms corresponding to the reference terms included in any of the document data 401 have been extracted in this way and all the reference terms in the similar meaning term database 300 have been processed (Step S505; YES), the setting unit 103 sets ranks to the extracted similar meaning terms (processing to set ranks to similar meaning terms; Step S507). A "rank" indicates an index of priority to output a similar meaning term associated with a search term when a search device, which will be described later, searches the reference term as a key word in the document data group 400. One rank value is set to each of the extracted similar meaning terms. In search, similar meaning terms are outputted in descending order of rank values set here.

Figure 7:
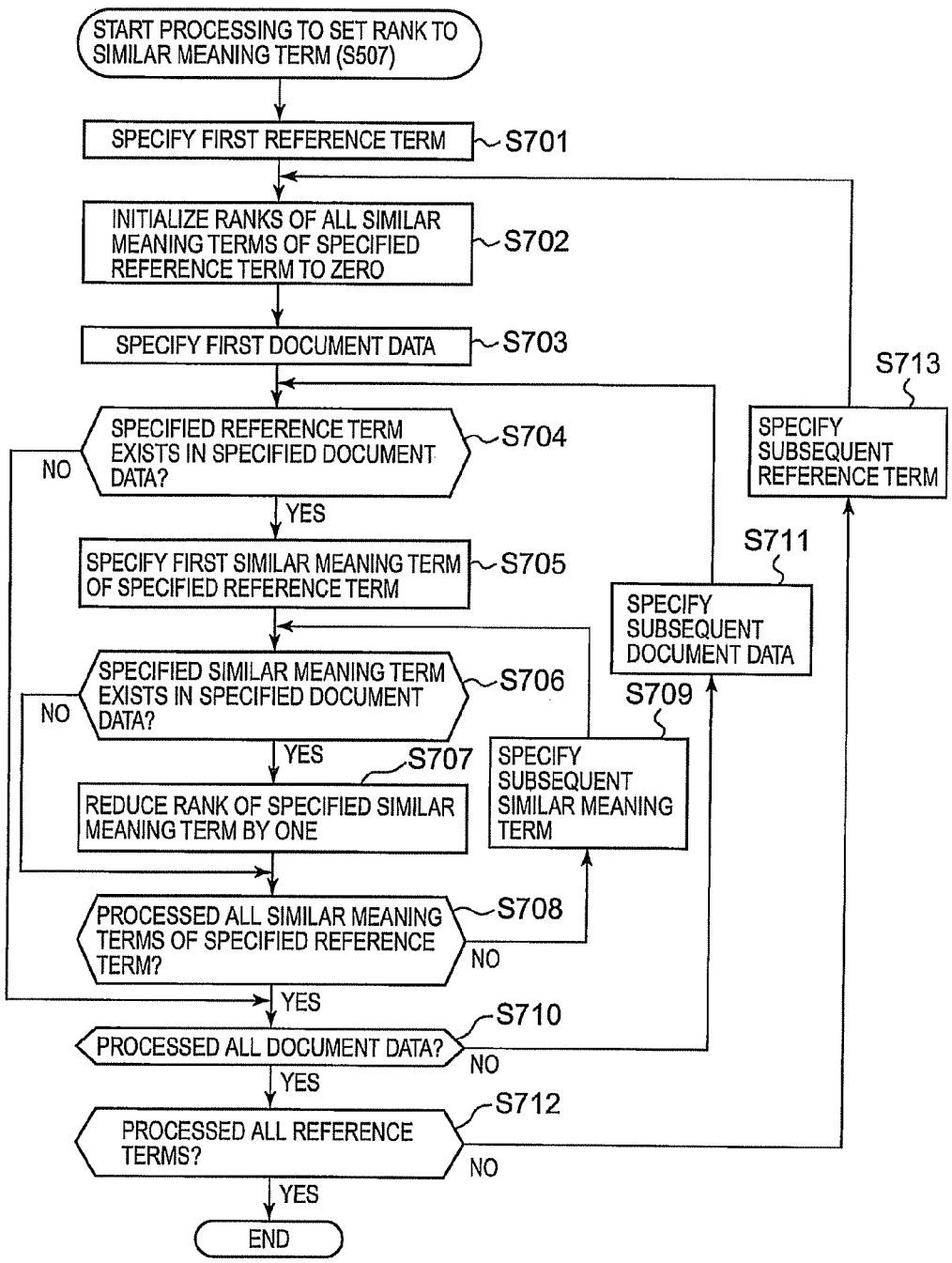
FIG. 7 is a flow chart illustrating the flow of processing to rank each similar meaning term in a device for generating a similar meaning term list according to the embodiment of the present invention.

A specific processing to set a rank to a similar meaning term will be again described in detail with reference to FIG. 7.

Once processing to rank a similar meaning term is started, the setting unit 103 first specifies the first reference term of the extracted reference terms (Step S701). In a specific example in FIG. 6, the first reference term "earth" is specified.

Next, the setting unit 103 initializes ranks of all similar meaning terms of the specified reference term to zero (Step S702). Specifically, if the first reference term "earth" is specified, the rank of the similar meaning term "ground surface" corresponding to "earth" is initialized to zero. If a plurality of similar meaning terms is extracted for the specified reference term, such initialization is performed for all the similar meaning terms.

Next, the setting unit 103 specifies the first document data 401 (Step S703), and determines if the specified reference term is in the specified document data 401 (Step S704). That is, the setting unit 103 accesses the document data group 400 stored in the storage unit 110 and determines if a string of the reference term is included in the entry word or the explanatory text in the first document data 401a.

If it is determined that the reference term is included (Step S704; YES), the first similar meaning term is specified for the specified reference term (Step S705). In the specific example in FIG. 6, for the reference term "earth" that is first specified, the corresponding similar meaning term "ground surface" is specified. If there is a plurality of corresponding similar meaning terms, only the first similar meaning term is specified.

Figure 8:
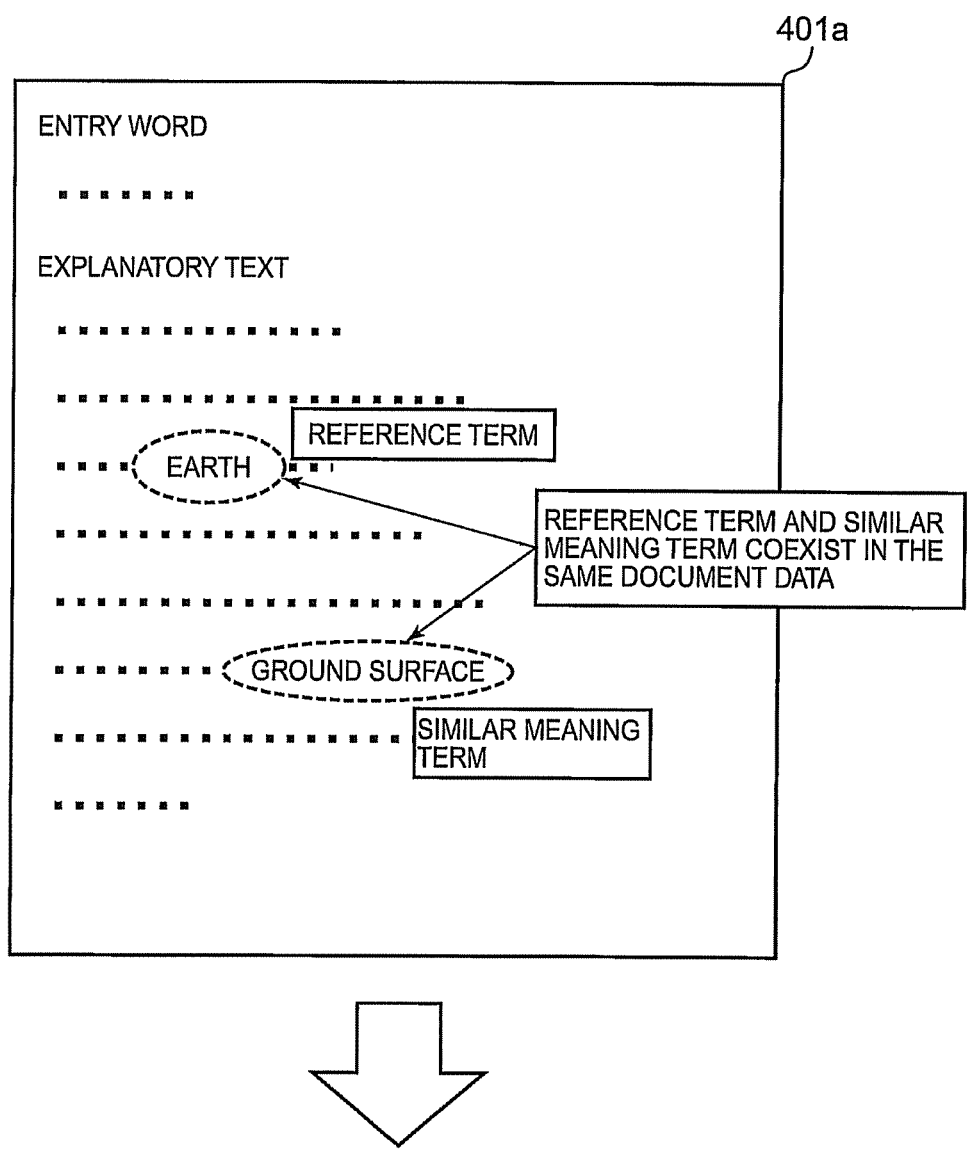
FIG. 8 is an illustration showing how a rank is set to each similar meaning term according to the embodiment of the present invention.

Once a similar meaning term is specified, the setting unit 103 determines if the specified similar meaning term exists in the specified document data 401 (Step S706). That is, in this example, it is determined if, in the document data 401 in which the reference term exists, a corresponding similar meaning term also exists. Specifically, as an example in FIG. 8, it is determined, that, in the document data 401 in which the reference term "earth" exists, if a corresponding similar meaning term "ground surface" also exists.

If it is determined that the similar meaning term exists (Step S706; YES), the rank of the specified similar meaning term is subtracted by one (S707). That is, since a similar meaning term that exists with a reference term in the same document data 401 can be found as a result to search the reference term in the same document data 401, the similar meaning term is determined to have a low necessity to be outputted to the user and therefore the rank corresponding to the output priority is degraded. In the specific example in FIG. 8, the value of the rank of the similar meaning term, "ground surface" that exists with the reference term "earth" in an explanatory text of the document data 401 is reduced by one.

If it is determined that the similar meaning term does not exist (Step S706; NO), the rank of the similar meaning term is not reduced and the value of the rank does not change. That is, since a similar meaning term that does not exist with a reference term in the same document data 401 is difficult to be found in searching the reference term, the priority of the similar meaning term to be outputted to the user when the reference term is searched is not reduced and remains the same.

After the rank of a similar meaning term is reduced or remains the same in this way, the setting unit 103 determines if all similar meaning terms of the specified reference term have been processed (Step S708). If there is an unprocessed similar meaning term (Step S708; NO), the setting unit 103 specifies the subsequent similar meaning term (Step S709) and processing returns to Step S706. That is, if the specified similar meaning term exists with a reference term in the same document data 401, the rank of the similar meaning term is reduced. In this way, processing from Steps S706 to S707 is repeated for all the similar meaning terms corresponding to the specified reference term, thereby reducing the rank of similar meaning terms that exist with the reference term in the same document data 401.

When all the similar meaning terms of the specified reference term have been processed (Step S708; YES), the setting unit 103 determines if all the document data 401 have been processed (Step S710). That is, of the plurality of document data 401a to 401c stored in the storage unit 110, it is determined if all of the document data 401 have been processed. If there is an unprocessed document data 401 (Step S710; NO), the setting unit 103 specifies a subsequent document data 401 (Step S711), processing returns to Step S704. That is, for the specified subsequent document data 401, it is determined if the reference term exists in an entry word and an explanatory text thereof. If the reference term exists, processing to reduce by one the rank of the similar meaning term that exists with the reference term in the document data 401 is further performed.

If the reference term does not exist in the specified document data 401 (Step S704; NO), processing for the similar meaning team corresponding to the reference term (Steps S705 to S709) is not performed, processing skips to Step S710 and processing for subsequent unprocessed document data 401 is performed. As document data 401 does not include a reference term, a reference term and a similar meaning term do not coexist and it is not necessary to reduce the rank of the similar meaning term.

Processing for setting a rank is repeated for each document data 401 in this way. The rank value of the similar meaning term corresponding to the reference term is reduced by one every time document data 401 in which the similar meaning term and the reference term are formed to coexist. As a result, the rank of the similar meaning term has its value reduced from an initial value zero by the number of documents of the document data 401 in which the similar meaning term and a reference term coexist. In other words, the rank is determined by a number of documents in which the reference term and similar meaning term are formed to coexist. For example, if there are N documents of document data 401 in which a similar meaning term and a reference term coexist, the rank of the similar meaning term has a value of $-N$ (negative N).

When all the document data 401 have been processed for all specified reference terms (Step S710; YES), the setting unit 103 determines if all the reference terms have been processed (Step S712). If there is an unprocessed reference term of the reference terms extracted by the extraction unit 102 (Step S712; NO), a subsequent reference term is specified of the unprocessed reference term(s) (Step S713), processing returns to Step S702. That is, for the specified subsequent reference term, processing to set a rank to a corresponding similar meaning term (Steps S702 to S711) is performed. In the specific example in FIG. 6, when processing for the first reference term "earth" has been completed, a subsequent reference term "game" is specified and processing to set ranks to three similar meaning terms, "bout", "match" and "competition" corresponding to the reference term is performed.

For all the extracted reference terms, processing to set ranks to similar meaning terms corresponding to each of the reference terms are repeated in this way, and when processing for all the reference terms have been completed (Step S712; YES), processing to set a rank to each similar meaning term in this flow chart is terminated. After that, processing returns to the flow chart in FIG. 5, the generation unit 104 generates the similar meaning term list 900 in such a way that the extracted reference terms are associated with similar meaning terms to which ranks are set (Step S508), and the generated similar meaning term list 900 is stored in the storage unit 110 such as the hard disk 154 and processing in this flow chart is terminated.

Figures 9, 10:
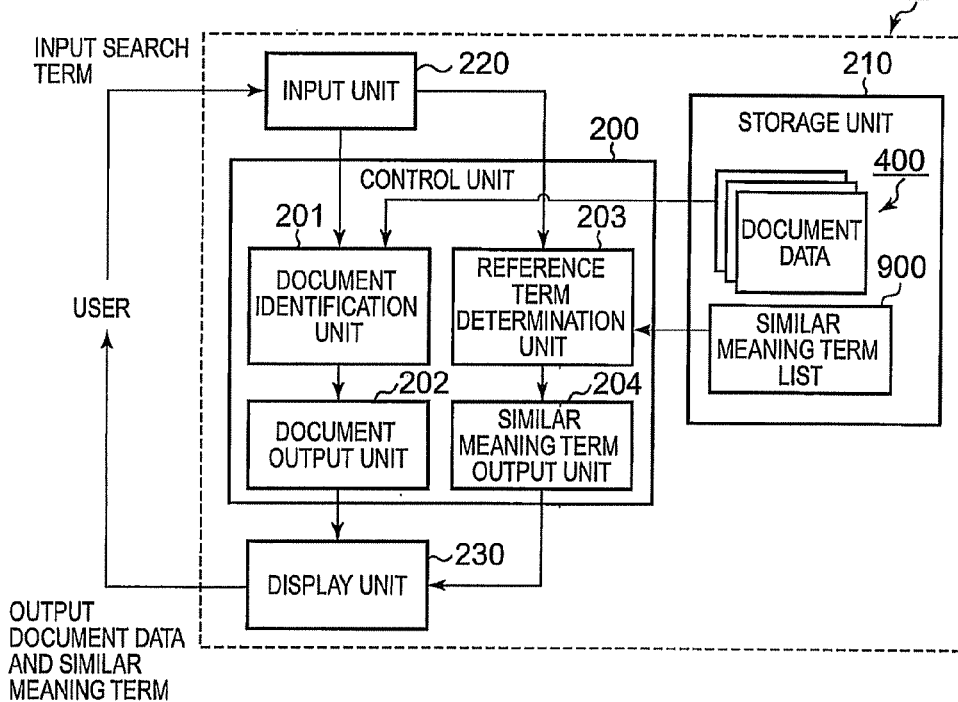
FIG. 9 is an example of a similar meaning term list generated according to the embodiment of the present invention.
FIG. 10 is a schematic configuration of a search device according to the embodiment of the present invention.

As a result, in the generated similar meaning term list 900, as shown in FIG. 9, similar meaning term(s) with a rank are associated with each of the reference terms extracted by the extraction unit 102, the rank being one value of an integer less or equal to zero. For example, since "ground surface", which is a similar meaning term of the reference term "earth", exists with the reference term in three pieces of document data 401, a rank −3 is set to the similar meaning term "ground surface". Since, for "bout", "match" and "competition", which are similar meaning terms of a reference term "game", the number of document data 401 in which each of the similar meaning terms and the reference term coexist is one, zero and four, respectively and therefore ranks −1, 0, and −4 are set to "bout", "match" and "competition", respectively.

By the above configuration, the generation device 1 for generating the similar meaning term list 900 according to the present embodiment extracts, from reference terms and corresponding similar meaning terms stored in the similar meaning term database 300, a reference term and similar meaning term(s) that exist any of the plurality of document data 401a to 401c. In a preferred configuration, the document data 401a to 401c is identical to a document to be searched using the similar meaning term list 900. The extracted similar meaning terms are set with output priorities that are reduced according to the number of document data 401 in which each of the similar meaning terms and the reference term coexist, thereby generating the similar meaning term list 900.

As a result, when search is performed using the generated similar meaning term list 900, a similar meaning term corresponding to a desired search term is presented to the user, thereby helping the user to perform search, and also an output priority of the similar meaning term that exists with the search term in the same document data 401 is reduced, thereby enabling the user to preferentially search in a wider variety of document data 401.

The present invention provides the generation device 1 for generating the above similar meaning term list 900 and a method for generating the similar meaning term list 900 using the generation device 1, as well as a search device to use the generated similar meaning term list 900 to search in document data group 400 and a search method using the search device.

The search device is usually realized by an information processor that is different from that of the generation device 1 for generating the similar meaning term list 900. Specifically, in the present embodiment, the search device will be described using a compact information processor having a function such as an electronic dictionary. That is, the similar meaning term list 900 for document data group 400 (a plurality of document data 401a to 401c) to be searched is generated by a common information processor as shown in FIGS. 1 and 2. Whereas search in the document data group 400 using the generated similar meaning term list 900 is realized by an information processor that is different from that of the generation device 1, i.e., a compact information processor such as an electronic dictionary.

Figure 11:
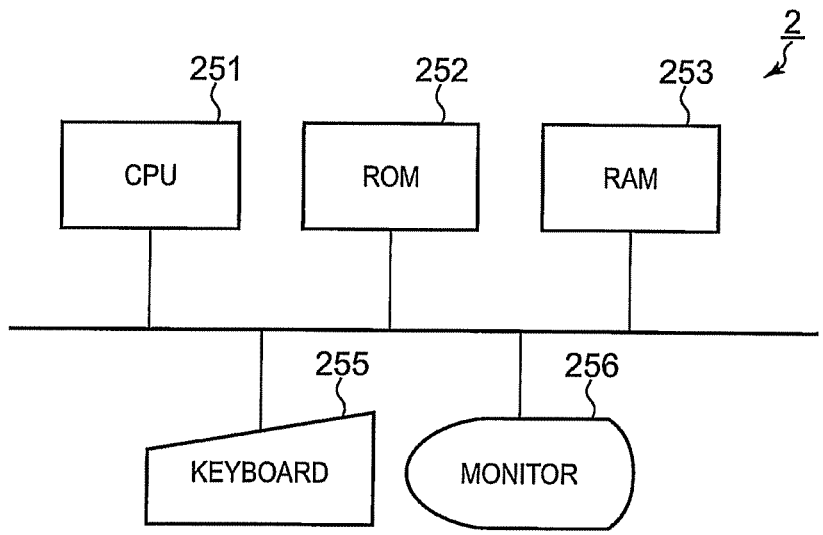
FIG. 11 is a physical configuration of a search device according to the embodiment of the present invention.

A configuration of such a search device 2 will be shown in FIG. 10. The search device 2 includes a control unit 200, a storage unit 210, an input unit 220 and a display unit 230. The search device 2 is physically configured as shown in FIG. 11 and includes a CPU 251, a ROM 252, a RAM 253, a keyboard 255 and a monitor 256. Hereinafter, components of the search device 2 will be described with reference to FIGS. 10 and 11.

The control unit 200 controls an entire operation of the search device 2, is connected to each component and exchanges a control signal and data with each component. That is, the control unit 200 is connected to the storage unit 210, input unit 220 and display unit 230, and utilizes functions of these components to perform search processing.

The control unit 200 includes a document identification unit 201, a document output unit 202, a reference term determination unit 203 and a similar meaning term output unit 204. In detail, as will be described later, the search device 2 uses functions of these units to perform processing to identify document data that includes a string of the desired search term (a string to be searched) of document data group 400 (the plurality of document data 401a to 401c) and further uses the similar meaning term list 900 to present the search term as well as similar meaning term(s) of the search term.

Such a control unit 200 (document identification unit 201, document output unit 202, reference term determination unit 203 and similar meaning term output unit 204) includes, for example, the CPU 251. As with the CPU 151 of the generation device 1, the CPU 251 is basically interconnected to each component via a system bus that is a transmission path for transferring command and data operates according to a computer program and various data that are stored in the ROM 252 and necessary for controlling the entire operation of the search device 2. While the CPU 151 temporarily stores in the RAM 253 a computer program and data necessary for advancing the processing read out from the ROM 252, as well as other data in the RAM 253. The CPU 251 cooperates with the ROM 252 and RAM 253 in this way, enabling the control unit 200 to control the entire operation of the search device 2.

The storage unit 210 includes, for example, a read-only storage medium such as the ROM 252 provided in the search device 2 and stores various data necessary for the control unit 200 to perform search processing. Specifically, the storage unit 210 stores the document data group 400 to be searched and the similar meaning term list 900.

This document data group 400 is the same as the document data group 400 stored in the storage unit 110 of the generation device 1, and the similar meaning term list 900 is the same as the similar meaning term list 900 generated by the generation device 1 from the document data group 400.

The input unit 220 includes, for example, an input device such as the keyboard 255 and receives input operation from the user. Specifically, the input unit 220 receives an operation to input a search term from the user. The received search term is supplied to the document identification unit 201 and reference term determination unit 203 of the control unit 200 and is used for processing to search document data 401 that includes the search term and processing if a reference term corresponding to the search term exists in the similar meaning term list 900.

The display unit 230 includes, for example, a display device such as the monitor 256 and displays results of processing by the control unit 200 to the user. Specifically, the display unit 230 outputs, to the monitor 256, document data 401 that include a search term inputted by the user, as well as similar meaning term(s) of the search term, thereby displaying the results to the user. This enables the user to obtain as an output result the document data 401 that include a search term inputted by the user and a similar meaning term and to utilize the output result in various ways.

The input unit 220 and display unit 230 may be composed of, for example, a touch panel that is a combination of an input device and a display device. In this case, a position input device such as a touch sensor or the like embedded in the touch panel composes the input unit 220 and a display device such as a liquid crystal display composes the display unit 230.

Figure 12:
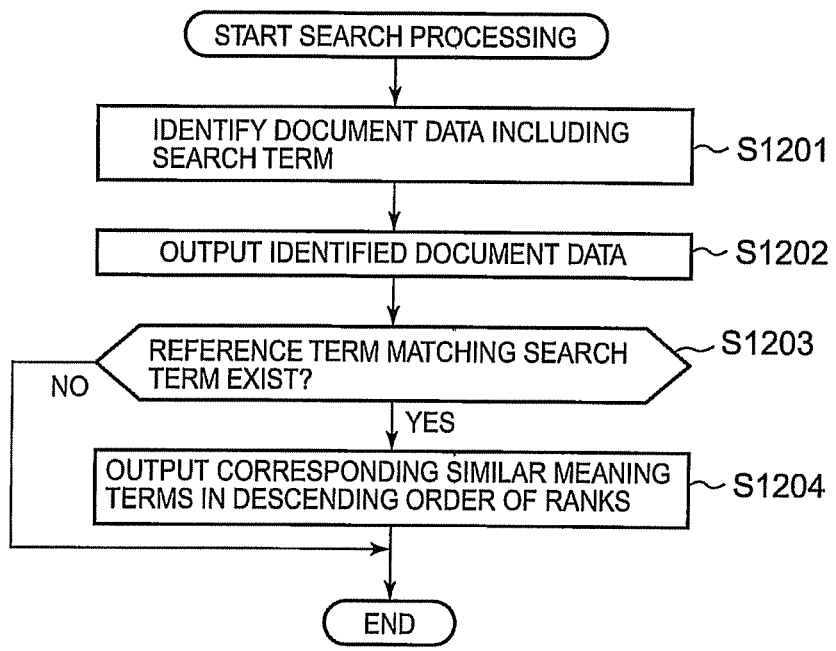
FIG. 12 is a flow chart illustrating the flow of processing by a search device according to the embodiment of the present invention.

The search device 2 configured as described above performs search processing under control of the control unit 200. Specifically, processing is performed according to procedures shown in the flow chart in FIG. 12.

Once the input unit 220 of the search device 2 receives an operation to input a search term by the user, this processing is started. That is, the user uses the keyboard 255 to input a desired search term and instructs search, thereby starting the processing.

When the search term is received from the user and processing is started, the document identification unit 201 first identifies, from the plurality of document data 401a to 401c, document data 401 that include the search term (Step S1201). That is, for example, if the user inputs the search term "game", the document identification unit 201 searches strings included in the plurality of document data 401a to 401c thereby to identify document data 401 that includes a string of the search term "game" (string to be searched).

This search is a so-called full-text search and is performed for a string of an entry word and a string of an explanatory text in each document data 401. That is, if either of the entry word or explanatory text in the document data 401 includes a string of an inputted search term, the document data 401 is identified. The identified document data 401 is temporarily kept in the RAM 253.

This search may be performed using any of many well-known search technologies. That is, for example, a sequential search (grep-type search) may be used in which the plurality of document data 401a to 401c are sequentially scanned thereby to find a search string or an index-type search may be used in which an index file is previously provided for faster search processing. In the case where the index-type search is employed, a so-called morphological analysis may be used to generate an index file or a so-called N-gram method (N-index method) may be used thereby to generate an index file, for example.

Once document data 401 that includes a search term is identified in this way, the document output unit 202 outputs the identified document data 401 (Step S1202). That is, the document output unit 202 displays document data 401 that includes an inputted search term on the display unit 230 such as the monitor 256. This enables the user to recognize what document data 401 includes the search term inputted by the user.

Further in the search device 2, the reference term determination unit 203 uses the similar meaning term list 900 thereby to determine if there is a reference term matching the search term (Step S1203). That is, the reference term determination unit 203 accesses the similar meaning term list 900 that is previously generated by the generation device 1 and stored in the storage unit 210 thereby to determine if any of the reference terms in the similar meaning term list 900 matches the inputted search term.

If it is determined that a reference term matching the search term does not exist (Step S1203; NO), further processing is not performed here and search processing is terminated. That is, since the inputted search term does not have a similar meaning term of the search term in the similar meaning term list 900, no similar meaning term is outputted, only the identified document data 401 is outputted and search processing is terminated.

If it is determined that a reference term matching the search term exists (Step S1203; YES), the similar meaning term output unit 204 outputs similar meaning terms corresponding to the reference term that matches the search term in descending order of ranks (output priorities) (Step S1204), and after that search processing is terminated. That is, the similar meaning term output unit 204 obtains, for a reference term matching the search term, all similar meaning terms that correspond to the reference term from the similar meaning term list and outputs to the user the obtained similar meaning terms in the order based on a rank value previously set to each similar meaning term, by, for example, displaying the obtained similar meaning terms on the monitor 256.

Figure 13:
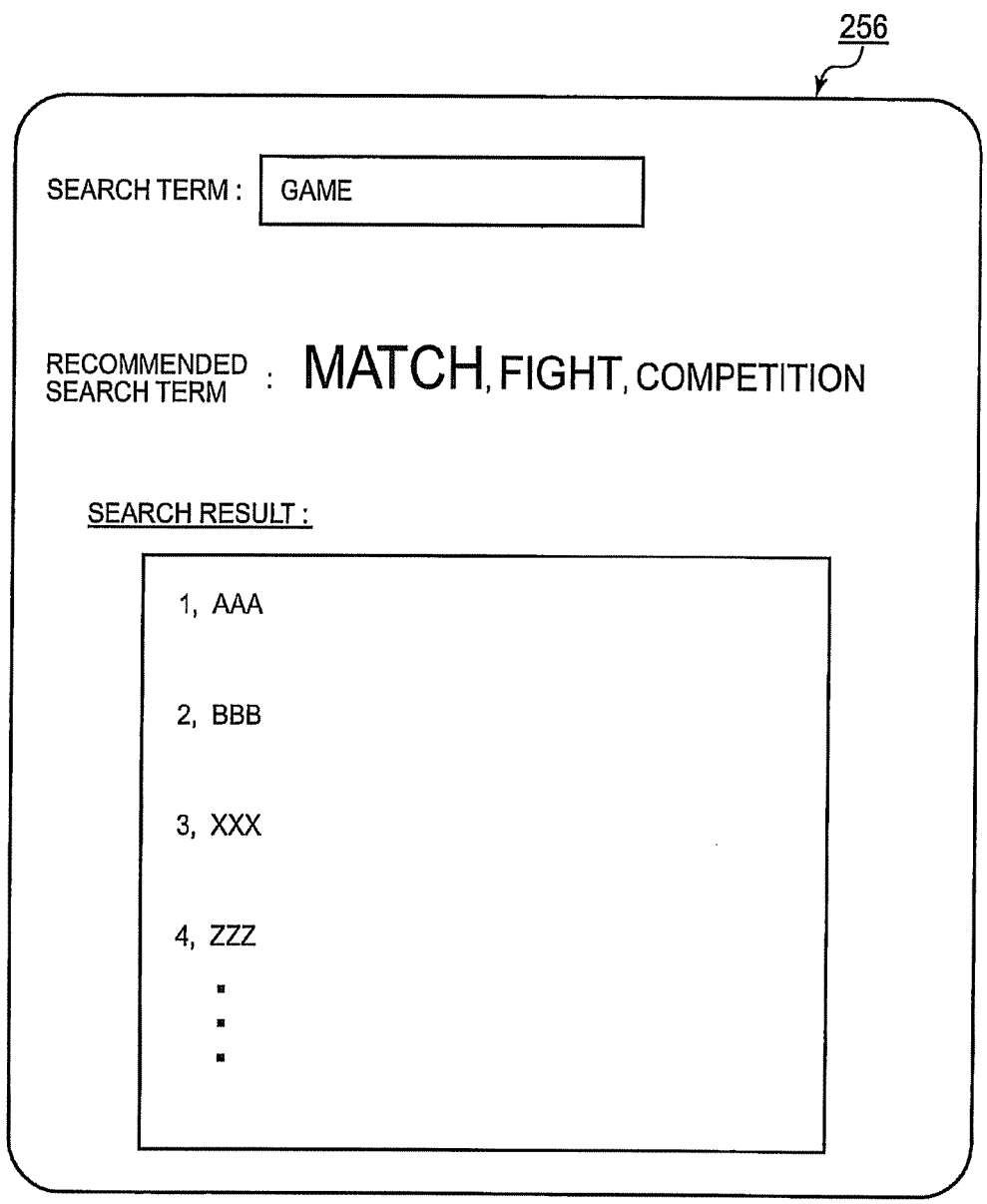
FIG. 13 is a search result according to the embodiment of the present invention that is displayed on a monitor.

If the user inputs, for example, the search term "game", document data 401 that includes the search term "game" is outputted as a search result, and three similar meaning terms "bout", "match" and "competition" that correspond to the reference term "game" in the similar meaning term list 900 are also outputted. As a result, specifically the output result as shown in FIG. 13 is displayed on the monitor 256 of the search device 2. That is, as shown in FIG. 13, as document data 401 that includes the search term "game", document data 401 such as "AAA", "BBB", "XXX" and "ZZZ" are displayed in a search result field in the monitor 256. Three terms "match", "bout" and "competition" stored in the similar meaning term list 900 are also displayed as similar meaning terms of the reference term "game" in the recommended search term field in the monitor 256.

At this time, with respect to the three similar meaning terms displayed as the recommended search term, rank values of the similar meaning terms are compared and the similar meaning terms are displayed in descending order of the ranks. The rank of each of the similar meaning terms is set in such a way that a smaller value is set to the rank of the similar meaning term that exists with the search term in a larger number of document data 401. Therefore, similar meaning terms are displayed in ascending order of the number of document data 401 in which the similar meaning term and the search term coexist. Specifically, as shown in FIG. 9, since the rank of the similar meaning term "bout" is set to be −1, the rank of the similar meaning term "match" is set to be 0, and the rank of the similar meaning term "competition" is set to be −4, similar meaning terms are sorted in descending order of ranks, that is, "match", "bout" and "competition" and outputted in this order as the monitor 256 in FIG. 13.

At this time, the three similar meaning terms are displayed in such a way that the similar meaning term with a larger rank value is displayed in larger characters. That is, the similar meaning term "match" ranked 0 is displayed in the largest characters and the similar meaning term "competition" ranked −4 is displayed in the smallest characters. By this, a similar meaning term that exists less with the search term in document data 401 is displayed so as to be more recognizable by the user as a recommended search term, thereby enabling the user to effectively search a large variety of document data 401.

By the above configuration, the search device 2 of the present embodiment, if an inputted search term matches any reference term of the similar meaning term list 900, outputs a search result by the search term, as well as similar meaning term(s) corresponding to the matching reference term. At this time, a similar meaning term that exists with the search term in less number of document data 401 is outputted in a higher priority. As a result, the user can efficiently search document data 401 that include a large variety of similar meaning terms.

Particularly, if document data 401 to be searched composes a dictionary as the present embodiment, a plurality of terms having similar meanings often exit in the same document data 401. Therefore, by reducing an output priority to the user of a similar meaning term for which the same document data 401 is repeatedly searched, document data 401 that include more variety of similar meaning terms can be searched and efficiently presented to the user.

The above embodiment is one example, and application of the present invention is not limited to the above embodiment. That is, a variety of applications are possible and every embodiment is included in the scope of the present invention.

For example, in the above embodiment, the search device 2 stores the document data group 400 in the storage unit 210 such as the ROM 252. However, without limitation to this, the search device 2 may include a mass storage device such as a hard disk and a DVD-ROM drive, and the document data group 400 may be stored in the hard disk, DVD-ROM or the like. Or, the search device 2 may be connected to a network or the like, and the document data group 400 and so on may exist on the network.

In the search device 2 according to the above embodiment, an input unit 220 for the user to input a search term and a display unit 230 to display a search result exist in the same device in which the control unit 200 and storage unit 210 exist. However, without limitation to this, the input unit 220 and display unit 230 may be outside the search device 2. That is, as shown in FIG. 14, for example, the search device 2 may not include the input unit 220 or the display unit 230, be connected to a terminal device 3 that includes the input unit 220 and display unit 230 via the network 150, and be configured as an information device such as an on-line electronic dictionary.

In this case, the search device 2 and the terminal device 3 exchange data to each other via the network 150 by using communication units 240a and 240b that are provided in the search device 2 and the terminal device 3 respectively. That is, a search term inputted by the user of the terminal device 3 is sent to the search device 2, and the control unit 200 performs search processing. After that, matching document data 401 and information of similar meaning terms as a search result are sent to the terminal device 3 and outputted to the user of the terminal device 3. Such a configuration produces the following advantages: the document data group 400 and so on in the search device 2 can be collectively managed and be available to a plurality of users, and also since the terminal device 3 on the user's side does not need to possess the document data group 400 and so on, the storage capacity required by the terminal device 3 can be reduced.

In the above embodiment the search device 2 was described as a compact information processor such as an electronic dictionary. However, without limitation to this, the search device 2 may be a common computer device for business and home or other information device such as a mobile phone. Without limitation to search by an electronic dictionary, search for various electronic data may be employed. For example, in a common computer device, searching an electronic file that includes a desired search term from electronic files stored in a mass storage device such as a hard disk, DVD-ROM or the like, may be employed. Or, by using connection to a network, a web page on the network may be searched.

With respect to the generation device 1, the generation device 1 in the above embodiment uses the similar meaning term database 300 and document data group 400 stored in the storage unit 110 such as the hard disk 154 thereby generating the similar meaning term list 900, and storing the generated similar meaning term list 900 in the storage unit 110. As another configuration, the similar meaning term database 300 and document data group 400 may be stored on the network 150 connected via the communication unit 140, or in a DVD-ROM loaded in the DVD-ROM drive 157.

In the above embodiment, the plurality of document data 401 composing the document data group 400 are composed of "entry words" and "explanatory texts". However, the document data 401 may be composed of various elements. For example, the document data 401 may have drawings and tables for explaining "entry words". Or, in searching in a common electronic file or the like other than searching in a dictionary, elements composing the document data 401 are not limited to "entry words" and "explanatory texts", and the document data 401 may have various forms of string data.

The generation device 1 for generating the similar meaning term list 900 according to the above embodiment sets an output priority of a similar meaning term on the basis of the number of document data 401 that include a similar meaning term and a reference term corresponding to the similar meaning term. That is, if one document data 401 includes at least one reference term corresponding to a similar meaning term, the rank value of the similar meaning term (an output priority) is equally reduced by one. However, the method to set a rank to a similar meaning term is not limited to this, and a rank may be set in various ways on the basis of various modes of appearance of at least either one of a similar meaning term and a reference term corresponding to the similar meaning term.

For example, the rank of a similar meaning term may be set in such a way that a similar meaning term that solely appears in larger number of the document data 401 or solely appears more frequently in the document data 401 is set with a lower rank. That is because the document data 401 that were not able to be identified by searching a reference term can be more often identified, and a similar meaning term that frequently appears in these document data 401 has more possibility to fulfill the user's search intention.

Or, the rank to be set to the similar meaning term may be changed according to the position where the similar meaning term appears in the document data 401. For example, a similar meaning term that appears closer to the beginning of the document data 401 may be set to have a higher rank and a higher output priority. Further, a similar meaning term that appears closer to a reference term is presumed to have more similar meaning to that of the reference term and therefore may be set to have a higher rank and a higher output priority.

In the above embodiment, "entry words" and "explanatory texts" in the document data 401 are not differentiated, and if either of the "entry words" and "explanatory texts" includes a similar meaning term corresponding to a reference term, the rank value of the similar meaning term is equally reduced. However, the method to set a rank to a similar meaning term is not limited to this, and "entry words" and "explanatory texts" may be differentiated. For example, the rank value of a similar meaning term may be changed according to a case in which a reference term is included in "entry words" and a similar meaning term is included in "explanatory texts" and a case in which a similar meaning term is included in "entry words" and a reference term is included in "explanatory texts".

In the search device 2 according to the above embodiment, a similar meaning term is outputted in such a way that a similar meaning term with a higher rank is outputted in larger characters. However, the method to output a similar meaning term is not limited to this, and a similar meaning term may be outputted in various modes on the basis of a set rank. For example, a similar meaning term with a higher rank may be displayed in more recognizable color. Or, a similar meaning term with a higher rank may be displayed in highlight by increasing the brightness of the similar meaning term. By this, since the similar meaning term with a higher rank is displayed so as to be more recognizable by the user, the user can perform an efficient search on the basis of the similar meaning term with a higher rank.

The search device 2 according to the above embodiment outputs a similar meaning term of a reference term matching an inputted search term, of reference terms in the similar meaning term list 900. However, output of a similar meaning term is not limited to an exact matching of a reference term and a search term, and a similar meaning term may be outputted of a reference term included in a search term. For example, if the string "patent right" is inputted as a search term, a similar meaning term of the reference term "patent"

included in the string may be outputted. This allows for dealing with a search term itself, as well as a term included in the search term, thereby outputting a similar meaning term flexibly for a variously inputted search term.

At this time, the user further may be able to specify a string of which a similar meaning term is outputted, from strings of a search term. That is, the search device 2 does not output a similar meaning term for all reference terms that are included in a search term, but outputs a similar meaning term for only a reference term matching a string specified by the user. Specifically, for example, in the case where an inputted search term is the string "the largest island in the world", if reference twins "world", "largest" and "island" are registered in the similar meaning term list 900 and similar meaning terms are outputted for all these three reference terms that are included in a search string, outputted similar meaning terms are too many. Therefore, similar meaning terms are outputted for only a string specified by the user, thereby preventing output from being complicated.

Or, by previously setting an upper limit of the number of similar meaning terms to be outputted, the search device 2 may output similar meaning terms in descending order of ranks until the number of outputted similar meaning terms reaches the upper limit. This can prevent a situation in which since similar meaning terms corresponding to reference terms that match or are included in an inputted search term are too many, output is complicated.

A generation device for generating a similar meaning term list, the generation device previously including a configuration for realizing a function according to the present invention, as well as a search device that uses the similar meaning term list can be provided. Also, an existing personal computer, information terminal device or the like can be made to serve as a generation device and a search device according to the present invention by applying a program to any of those existing devices. That is, by applying a generation program or a search program for realizing each function and configuration of the generation device 1 and search device 2 exemplified by the above embodiment so as to be performed by a CPU or the like that controls an existing personal computer, information terminal device or the like, each of the existing devices can be made to serve as the generation device 1 and search device 2 according to the present invention. A method for generating a similar meaning term list and a search method using the similar meaning term list according to the present invention can be performed using the generation device 1 and search device 2, respectively.

Any method for applying such a program may be used. For example, the program can be applied by being stored in a computer-readable storage medium such as a CD-ROM, DVD-ROM and a memory card, or via a communication medium such as the Internet.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A method for generating a similar meaning term list comprising steps of:
    preparing a similar meaning term database storing a plurality of reference terms and a plurality of similar meaning terms in association with each other such that several similar meaning terms correspond to each of the reference terms;
    preparing a document data group including a plurality of documents to be searched;
    determining if each of the reference terms stored in the similar meaning term database is included in a document to be searched;
    when it is determined that the reference term is included in the document, determining, for each of the similar meaning terms corresponding to the reference term, if the similar meaning term is included in the same document;
    determining output priorities to the similar meaning terms in such a way that the smaller a number of documents that were determined to include both the reference term and a similar meaning term corresponding to the reference term, the higher the output priority of the similar meaning term, by executing the determination if the reference term is included and the determination if the similar meaning terms are included for all documents; and
    generating a similar meaning term list in which the extracted reference term, the similar meaning term corresponding to the reference term, and the output priority determined to the similar meaning term are associated with one another.

2. The method for generating the similar meaning term list according to claim 1, wherein the similar meaning term list is used for searching the document data group that includes a plurality of documents to be searched by the reference term.

3. A search method with the use of a similar meaning term list in which a reference term, a similar meaning term that has similar meaning to the reference term, and an output priority determined to the similar meaning term are related to one another, the search method comprising:
    a document identification step to identify document including a desired search string from a document data group including a plurality of documents to be searched;
    a document output step to output the identified document;
    a reference term determination step to determine if a reference term in a similar meaning term list is included in the search string; and
    a similar meaning term output step to output the similar meaning term corresponding to the reference term that was determined to be included in the search string and an output priority determined to the similar meaning term in such a way that the similar meaning term and the output priority are associated with each other;
    the similar meaning term list being generated by:
        preparing a similar meaning term database storing a plurality of reference terms and a plurality of similar meaning terms in association with each other such that several similar meaning terms correspond to each of the reference terms;
        preparing a document data group including a plurality of documents to be searched;
        determining if each of the reference terms stored in the similar meaning term database is included in a document to be searched;
        when it is determined that the reference term is included in the document, determining, for each of the similar meaning terms corresponding to the reference term, if the similar meaning term is included in the same document;
        determining output priorities to the similar meaning terms in such a way that the smaller a number of documents that were determined to include both the reference term and a similar meaning term corresponding to the reference term, the higher the output priority of the similar meaning term, by executing the determination if the reference term is included and the determination if the similar meaning terms are included for all the documents; and associating the reference term, the similar meaning term corresponding to the reference term, and the output priority determined to the similar meaning term with one another.

4. The search method according to claim 3 wherein:

the reference term determination step comprises determining if a reference term in the similar meaning term list is included in a string specified by a user of the search strings; and the similar meaning term output step comprises outputting the similar meaning term corresponding to the reference term that was determined to be included in the string specified by the user in such a way that the similar meaning term is associated with an output priority determined to the similar meaning term.

5. A device for generating a similar meaning term list, the device comprising:

a memory storing a similar meaning term database storing a plurality of reference terms and a plurality of similar meaning terms in association with each other such that several similar meaning terms correspond to each of the reference terms, and a document data group including a plurality of documents to be searched; and a processor executing processes comprising:

determining if each of the reference terms stored in the similar meaning term database is included in a document to be searched;

when it is determined that the reference term is included in the document; determining, for each of the similar meaning terms corresponding to the reference term, if the similar meaning term is included in the same document;

determining output priorities to the similar meaning terms in such a way that the smaller a number of documents that were determined to include both the reference term and a similar meaning term corresponding to the reference term, the higher the output priority of the similar meaning term, by executing the determination if the referenced term is included and the determination if the similar meaning terms are included for all the documents; and generating a similar meaning term list in such a way that the reference term, the similar meaning term corresponding to the reference term, and the output priority determined to the similar meaning term are associated with one another.

6. The device for generating the similar meaning term list according to claim 5, wherein the similar meaning term list is used for searching the document data group that includes a plurality of documents to be searched by the reference term.

7. A search device comprising:

a memory storing a similar meaning term list in which a reference term, a similar meaning term that has a similar meaning to the reference term, and an output priority determined to the similar meaning term are related to one another; and a processor executing processes comprising:

identifying a document including a desired search string from a document data group including a plurality of documents to be searched;

outputting the identified document;

determining if a reference term in a similar meaning term list is included in the search string; and outputting the similar meaning term corresponding to the reference term that was determined to be included in the search string and an output priority determined to the similar meaning term in such a way that the similar meaning term and the output priority are associated with each other, the similar meaning term list being generated by:

preparing a similar meaning term database storing a plurality of reference terms and a plurality of similar meaning terms in association with each other such that several similar meaning terms correspond to each of the reference terms;

preparing a document data group including a plurality of documents to be searched;

determining if each of the reference terms stored in the similar meaning term database is included in a document to be searched;

when it is determined that the reference term is included in the document, determining, for each of the similar meaning terms corresponding to the reference term, if the similar meaning term is included in the same document;

determining output priorities to the similar meaning terms in such a way that the smaller a number of documents that were determined to include both the reference term and a similar meaning term corresponding to the reference term, the higher the output priority of the similar meaning term, by executing the determination if the reference term is included and a determination if the similar meaning terms are included for all the documents; and associating the reference term, the similar meaning term corresponding to the reference term, and the output priority determined to the similar meaning term are associated with one another.

8. The search device according to claim 7 wherein

In the determination for a reference term, if the reference term in the similar meaning term list is included in a string specified by a user of the search strings is determined; and In the output of the similar meaning term, a similar meaning term corresponding to the reference term that was determined to be included in the string specified by the user is output in such a way that an output priority determined to the similar meaning term is associated with the similar meaning term.

* * * * *